United States Patent
Mishina et al.

(10) Patent No.: US 10,997,014 B2
(45) Date of Patent: May 4, 2021

(54) ENSURED SERVICE LEVEL BY MUTUAL COMPLEMENTATION OF IOT DEVICES

(71) Applicant: INTERNATIONAL BUSINESS MACHINES CORPORATION, Armonk, NY (US)

(72) Inventors: Takuya Mishina, Kanagawa (JP); Sanehiro Furuichi, Tokyo (JP); Norie Iwasaki, Kanagawa (JP); Fumiko Akiyama, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 184 days.

(21) Appl. No.: 16/269,084

(22) Filed: Feb. 6, 2019

(65) Prior Publication Data
US 2020/0252263 A1 Aug. 6, 2020

(51) Int. Cl.
*G06F 11/07* (2006.01)

(52) U.S. Cl.
CPC ...... *G06F 11/0793* (2013.01); *G06F 11/0706* (2013.01)

(58) Field of Classification Search
CPC .. G06F 11/142; G06F 11/1428; G06F 11/143; G06F 11/2023–2033; H04L 41/0654–0672; H04L 69/40
See application file for complete search history.

(56) References Cited

U.S. PATENT DOCUMENTS

| 8,471,910 B2 * | 6/2013 | Cleary ............ G08B 13/19608 348/159 |
| 2016/0048408 A1 * | 2/2016 | Madhu ................ G06F 11/2023 718/1 |
| 2017/0006141 A1 | 1/2017 | Bhadra |

(Continued)

FOREIGN PATENT DOCUMENTS

EP 2837156 8/2018

OTHER PUBLICATIONS

Amazon, "DJI Phantom 3 Standard Quadcopter Drone with 2.7K HD Video Camera", available at: https://www.amazon.com/dp/B013U0F6EQ, last downloaded: Nov. 14, 2018, 10 pages.

(Continued)

*Primary Examiner* — Joseph R Kudirka
(74) *Attorney, Agent, or Firm* — Tutunjian & Bitetto, P.C.; Randall Bluestone

(57) ABSTRACT

A computer-implemented method is provided for ensuring a particular service level provided by multiple devices. The method includes maintaining, by a database, complementation parameters for a set of device groups. Each of the device groups includes at least two devices such that one of the two devices can complement at least one functionality of another one of the at least two devices in a same one of the device groups. The method further includes monitoring, by a processor operatively coupled to the database, the devices in the device groups to detect device malfunctions. The method also includes, responsive to a detection of a malfunctioning device from among the device groups, ensuring, by the (Continued)

processor, the particular service level by changing complementation parameters of a corresponding one of the devices paired with the malfunctioning device.

20 Claims, 9 Drawing Sheets

(56) References Cited

U.S. PATENT DOCUMENTS

2017/0078440 A1   3/2017  Godfrey et al.
2018/0081730 A1   3/2018  Duttagupta et al.
2018/0276091 A1*  9/2018  Nosov .................. G06F 11/203

OTHER PUBLICATIONS

Robusta Editorial Departmewnt, "Haneda Airport's Robot Public Experiment, Seven Participating Companies Decided to Execute", available at: https://www.robostart.info, Dec. 2017, 8 pages.

* cited by examiner

ENSURED SERVICE LEVEL BY MUTUAL COMPLEMENTATION OF IOT DEVICES

BACKGROUND

Technical Field

The present invention generally relates to the Internet of Things (IoT), and more particularly to an ensured service level by mutual complementation of IoT devices.

Description of the Related Art

Currently, many Information Technology (IT) services include and/or otherwise involve Internet of Things (IoT) devices. The low-cost nature of IoT devices enables an IT service to run with many IoT devices, but also leads to a high fault rate and small computation resources, which may lower the corresponding service level. As an example, an exemplary service level can involve the following: down time rate should be lower than 0.1% of the total operating time, and so forth.

Mutual complementation using available IoT devices can mitigate service-level decline. However, it is not straightforward to acquire complementation parameters for configurable IoT devices. For example, a monitoring camera has parameters like zoom, pan, tile, resolution, frame rate, and so forth.

Thus, there is need for an approach for ensuring a service level provided by multiple devices.

SUMMARY

According to an aspect of the present invention, a computer-implemented method is provided for ensuring a particular service level provided by multiple devices. The method includes maintaining, by a database, complementation parameters for a set of device groups. Each of the device groups includes at least two devices such that one of the two devices can complement at least one functionality of another one of the at least two devices in a same one of the device groups. The method further includes monitoring, by a processor operatively coupled to the database, the devices in the device groups to detect device malfunctions. The method also includes, responsive to a detection of a malfunctioning device from among the device groups, ensuring, by the processor, the particular service level by changing complementation parameters of a corresponding one of the devices paired with the malfunctioning device.

According to another aspect of the present invention, a computer program product is provided for ensuring a particular service level provided by multiple devices. The computer program product includes a non-transitory computer readable storage medium having program instructions embodied therewith. The program instructions are executable by a computer to cause the computer to perform a method. The method includes maintaining, by a database, complementation parameters for a set of device groups. Each of the device groups includes at least two devices such that one of the two devices can complement at least one functionality of another one of the at least two devices in a same one of the device groups. The method further includes monitoring, by a processor operatively coupled to the database, the devices in the device groups to detect device malfunctions. The method also includes, responsive to a detection of a malfunctioning device from among the device groups, ensuring, by the processor, the particular service level by changing complementation parameters of a corresponding one of the devices paired with the malfunctioning device.

According to yet another aspect of the present invention, a computer processing system is provided for ensuring a particular service level provided by multiple devices. The computer processing system includes a database for maintaining complementation parameters for a set of device groups. Each of the device groups includes at least two devices such that one of the two devices can complement at least one functionality of another one of the at least two devices in a same one of the device groups. The computer processing system further includes a processor, operatively coupled to the database, configured to monitoring the devices in the device groups to detect device malfunctions. The processor further runs the program code to, responsive to a detection of a malfunctioning device from among the device groups, ensure the particular service level by changing complementation parameters of a corresponding one of the devices paired with the malfunctioning device.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to an ensured service level by mutual complementation of IOT devices.

In an embodiment, an approach is provided to ensure service level by acquiring complementation parameters.

Figure 1:
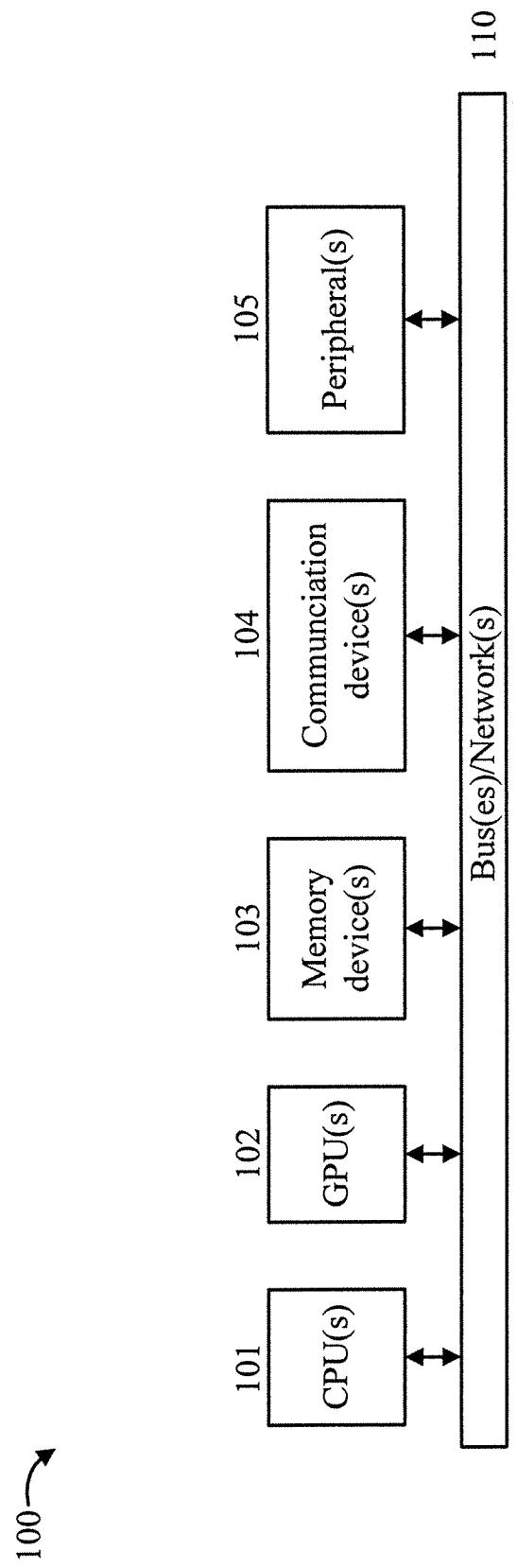
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules in order to transform the computer processor system into a special purpose computer configured to implement various aspects of the present invention. In an embodiment, special purpose hardware (e.g., Application Specific Integrated Circuits, and so forth) can be used to implement various aspects of the present invention.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used (e.g., see FIGS. 8-9). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
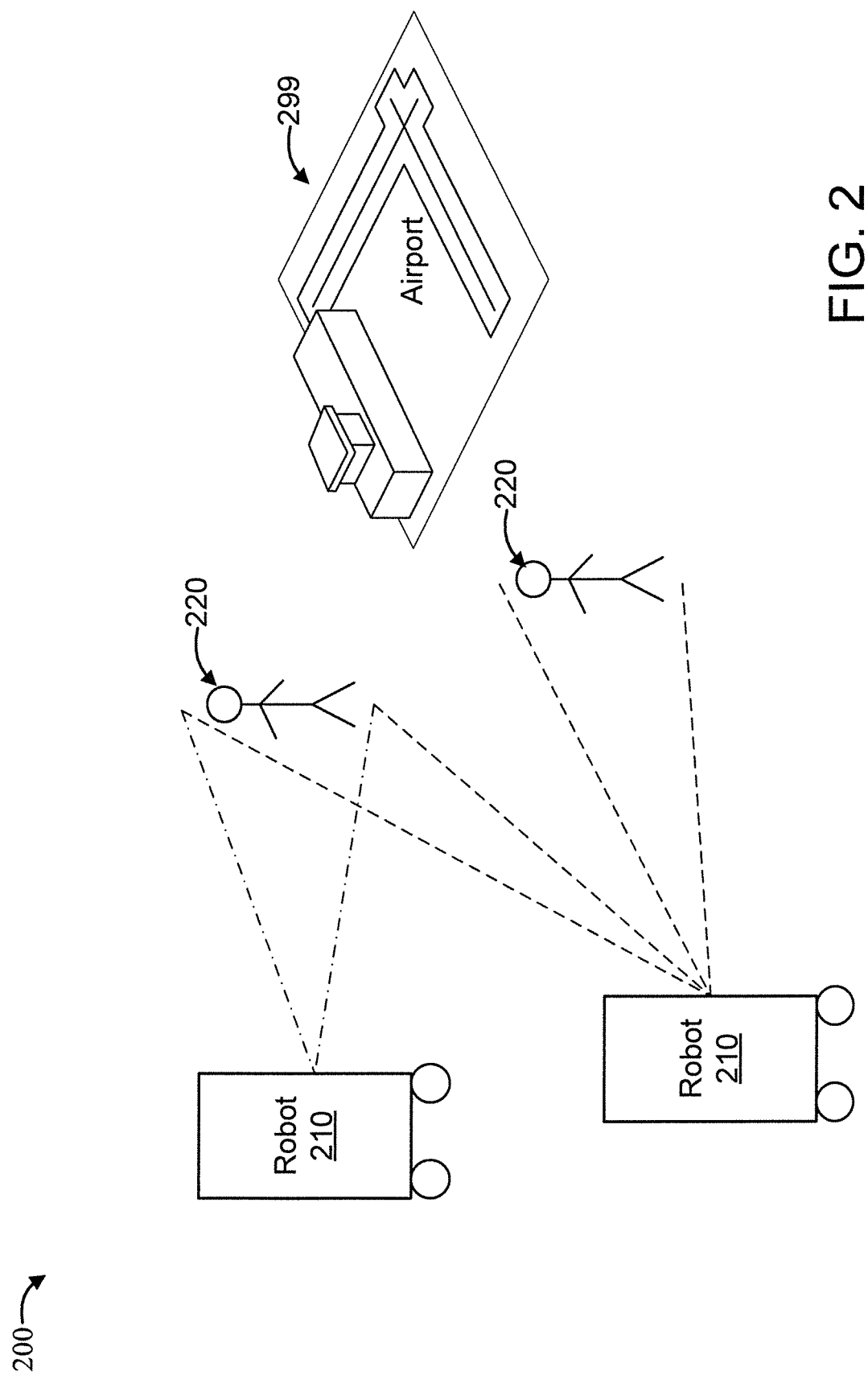
FIG. 2 is a block diagram showing an exemplary first exemplary scenario to which the present invention can be applied, in accordance with an embodiment of the present invention.

FIG. 2 is a block diagram showing an exemplary first exemplary scenario 200 to which the present invention can be applied, in accordance with an embodiment of the present invention. The first exemplary scenario 200 relates to security monitoring and passenger guidance in an airport 299.

Robots 210 walk around the airport 299 to provide guidance service to passengers 220, and in parallel they provide monitoring video to security personnel. When a Service Level Agreement (SLA) ensures the coverage of camera monitoring, then guidance service may be suspended as a result. When a SLA ensures the availability of the guidance service, then some of camera monitoring functionality may be reduced (e.g., resolution, coverage).

In the scenario 200 of FIG. 2, the complementation parameter acquisition can involve the following: determine how long a robot 210 should move to a guide-target person 220 by analyzing the robot's microphone and speaker gain/sensitivity. Hence, when some device is broken, move and/or otherwise use other available devices to ensure availability of guidance service, or monitoring functionality to comply with a particular SLA.

While robots 210 are used in the first exemplary scenario 200, it is to be appreciated that other devices including, but not limited to, drones and so forth, can also be used. These and other variations of the elements of FIG. 2 are readily determined by one of ordinary skill in the art given the teachings of the present invention provided herein while maintaining the spirit of the present invention.

Figure 3:
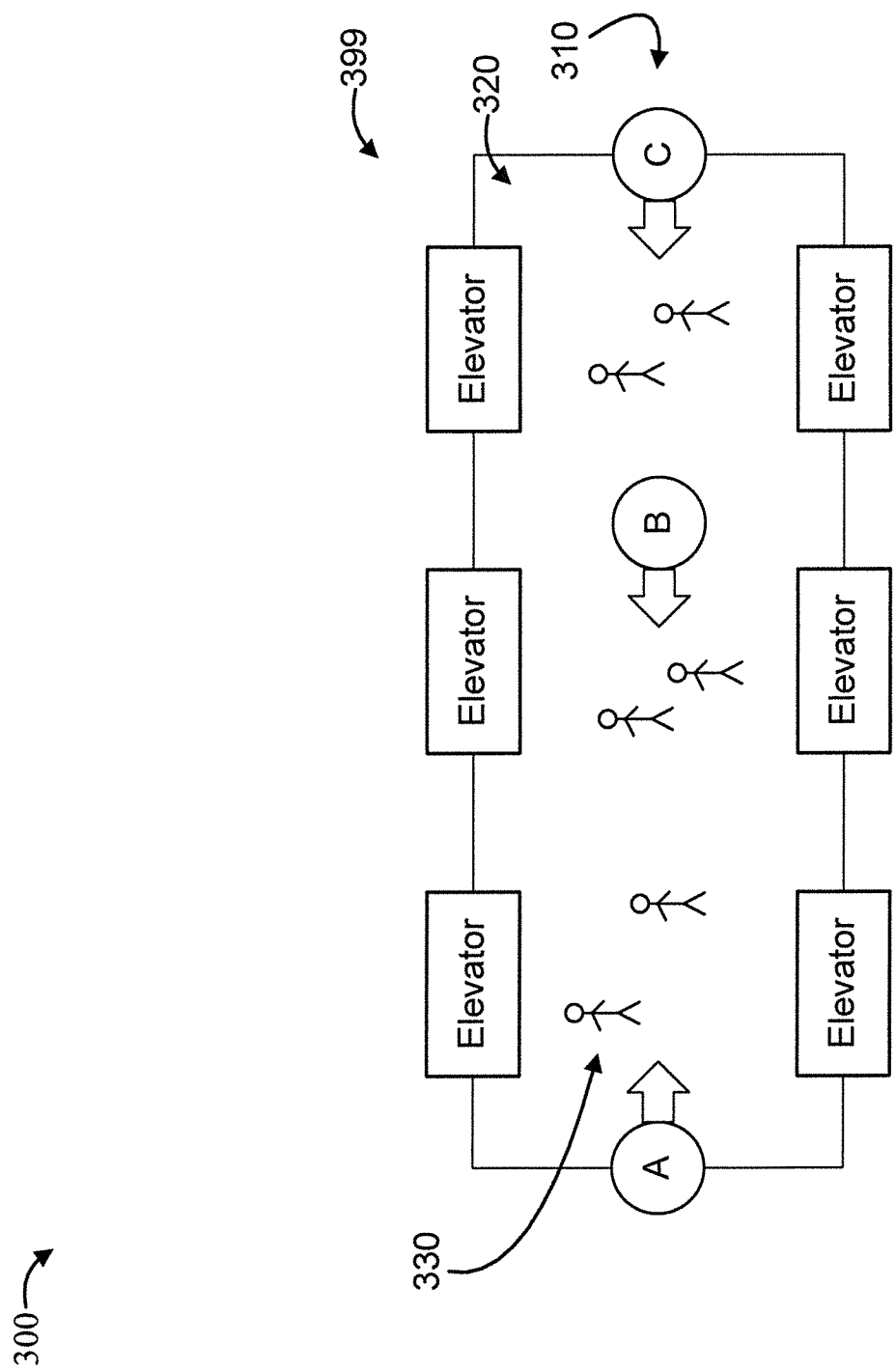
FIG. 3 is a block diagram showing a second exemplary scenario to which the present invention can be applied, in accordance with an embodiment of the present invention.
Figure 4:
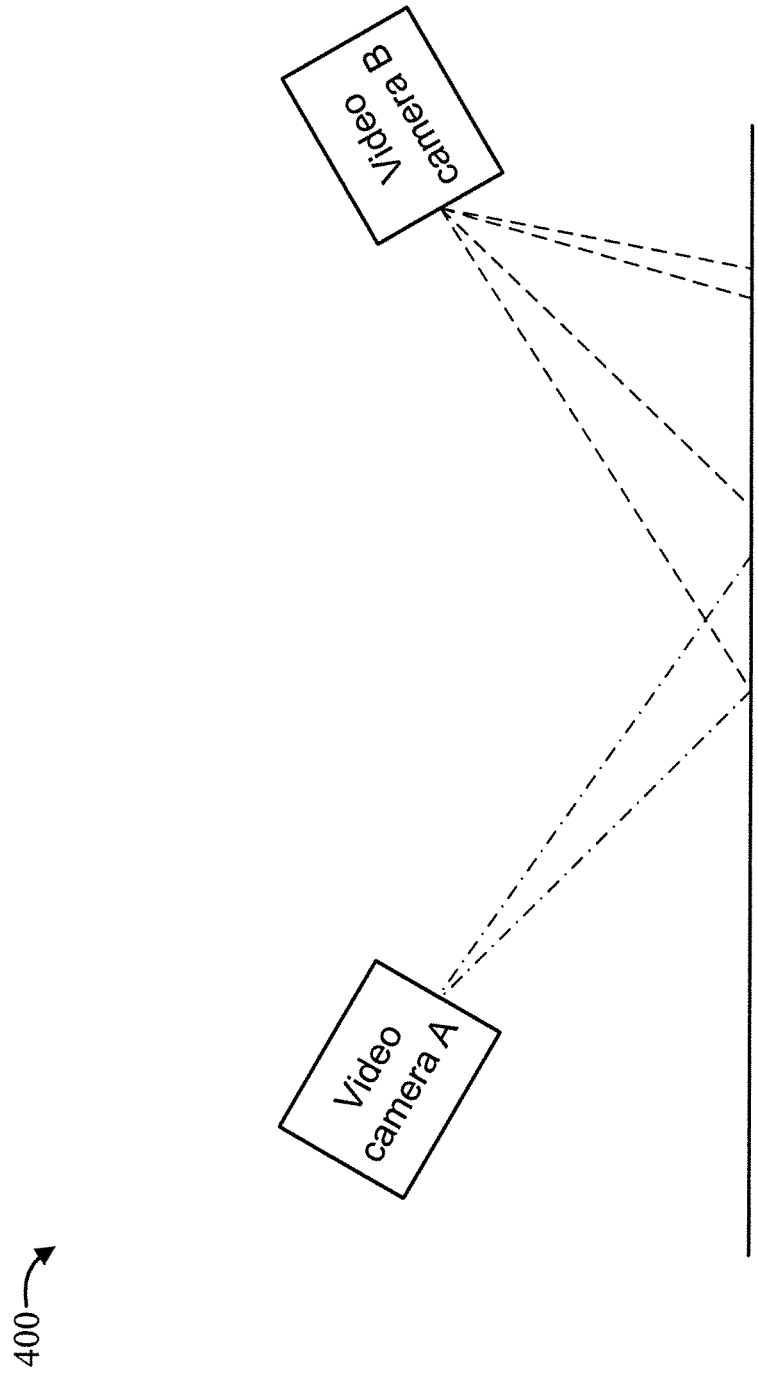
FIG. 4 further shows an exemplary configuration of cameras A and B of FIG. 3, in accordance with an embodiment of the present invention.

FIG. 3 is a block diagram showing a second exemplary scenario 300 to which the present invention can be applied, in accordance with an embodiment of the present invention. The second exemplary scenario 300 relates to a fixed monitoring camera cluster (hereinafter "monitoring camera cluster") 310 in an office building environment 399. The monitoring camera cluster includes cameras A, B, and C. The arrows in FIG. 4 shows the general direction to which the respective cameras A, B, and C point. FIG. 4 further shows an exemplary configuration of cameras A and B of FIG. 3, in accordance with an embodiment of the present invention.

The monitoring camera cluster 310 monitors a certain area (e.g., an elevator hall) 320 serving multiple people 330. When one of the cameras in the monitoring camera cluster 310 malfunctions, other cameras from the monitoring camera cluster 310 can complement its (the malfunctioning one) coverage by adjusting their zoom/pan/rotation parameters.

The complementation parameters for cameras A, B, and C, can be as follows: {"A": [{"B": "tilt −10 degree, zoom 80%"}], "B": [{"A": "tilt −15 degree, zoom 80%"}, {"C": "tilt −15 degree, zoom 60%"}], "C": [{"B": "rotate 0.5 times per second"}]}

As shown in FIG. 4, camera B can subsume the coverage area of camera A.

In the scenario 300 of FIG. 3, the complementation parameter acquisition can involve the following: randomly changing zoom/pan/rotation parameters by calling a standardized API (ONVIF) to learn what parameter set can complement another camera.

Hence, when a camera is broken, set the learned parameters to available (remaining) cameras to record the coverage of the broken camera.

Figure 5:
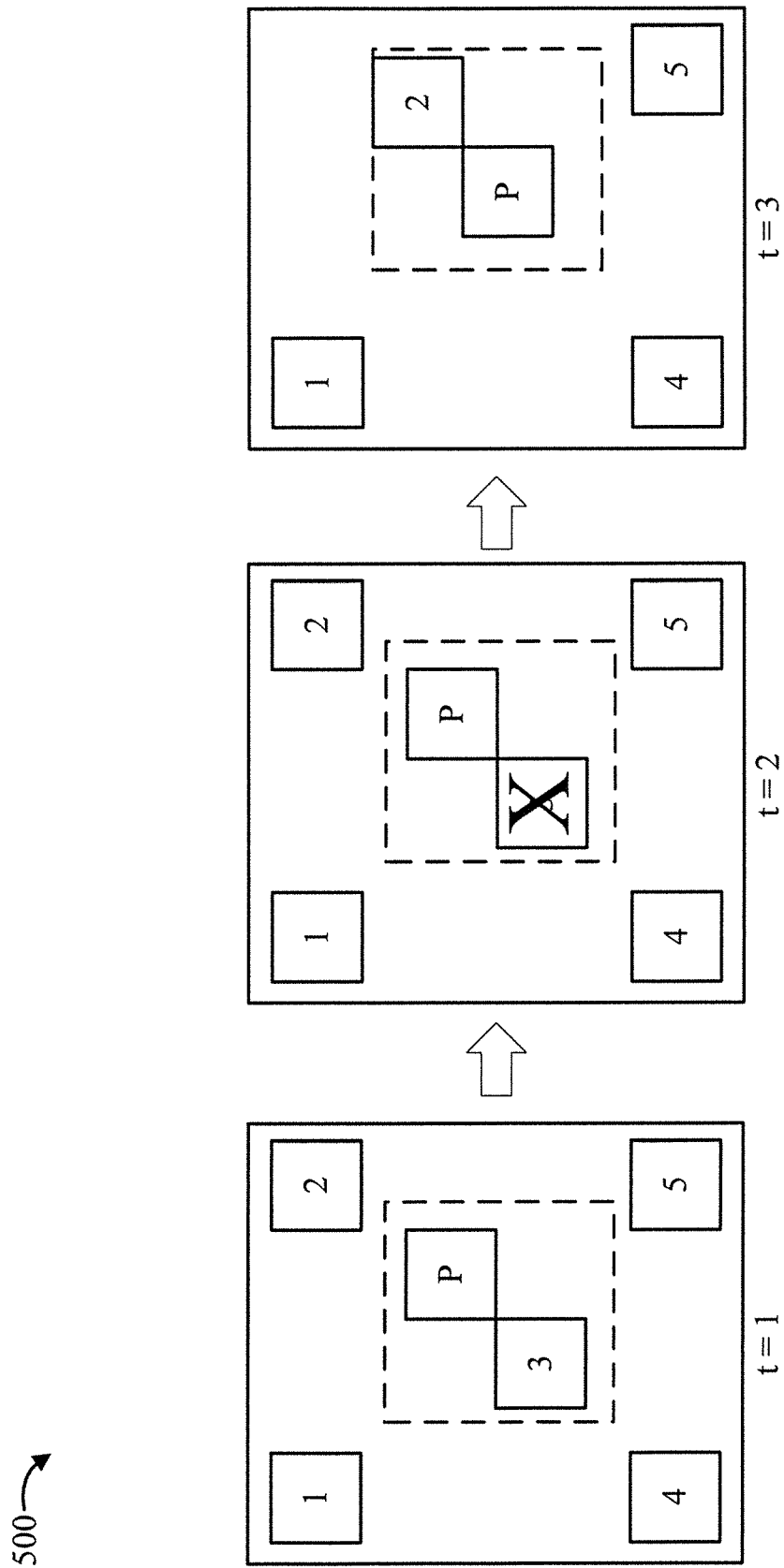
FIG. 5 is a block diagram showing a third exemplary scenario to which the present invention can be applied, in accordance with an embodiment of the present invention.

FIG. 5 is a block diagram showing a third exemplary scenario 500 to which the present invention can be applied, in accordance with an embodiment of the present invention.

The third exemplary scenario 500 involves 5 robots distributed under an algorithm that maxims mutual distances to maximize its monitoring camera coverage (SLE ensures guidance-service level). The 5 robots are indicated by respective corresponding integers from 1 through 5 arranged in a box. Moreover, a person is indicated by the letter "P" in a box.

At time t=1, device 3 is providing guidance service to a person.

At time t=2, device 3 is broken.

At time t=3, device manager changes parameter of device 2 to move it to complement device 3.

Hence, by use of the present invention, SLA for guidance service can be ensured because device manager knows what parameter enables device 2 to move to the "complementation coverage area" while camera coverage, which is out of SLA, is declined and violates the distribution algorithm.

Figure 6:
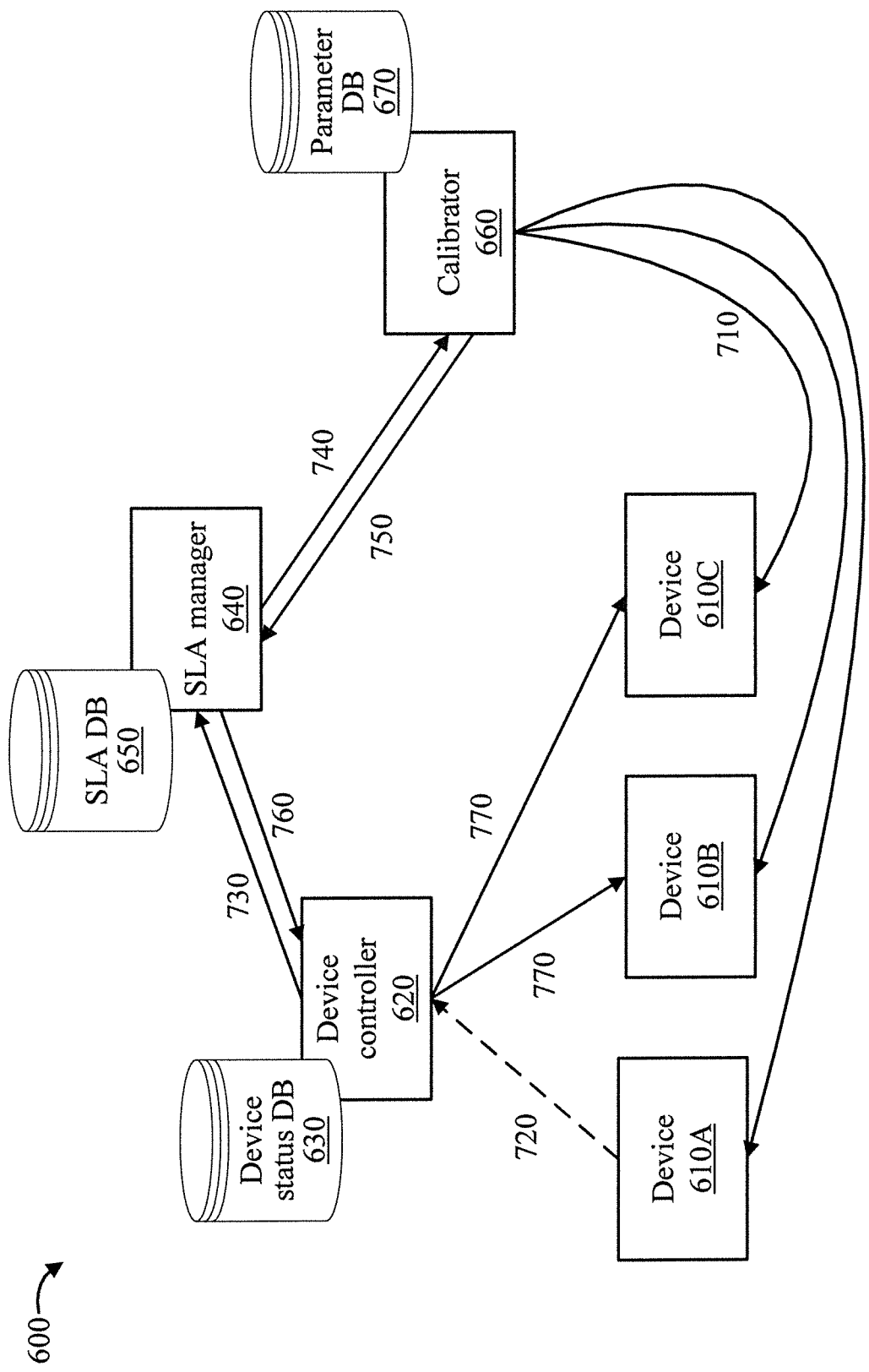
FIG. 6 is a block diagram showing an exemplary system for ensuring service level, in accordance with an embodiment of the present invention.
Figure 7:
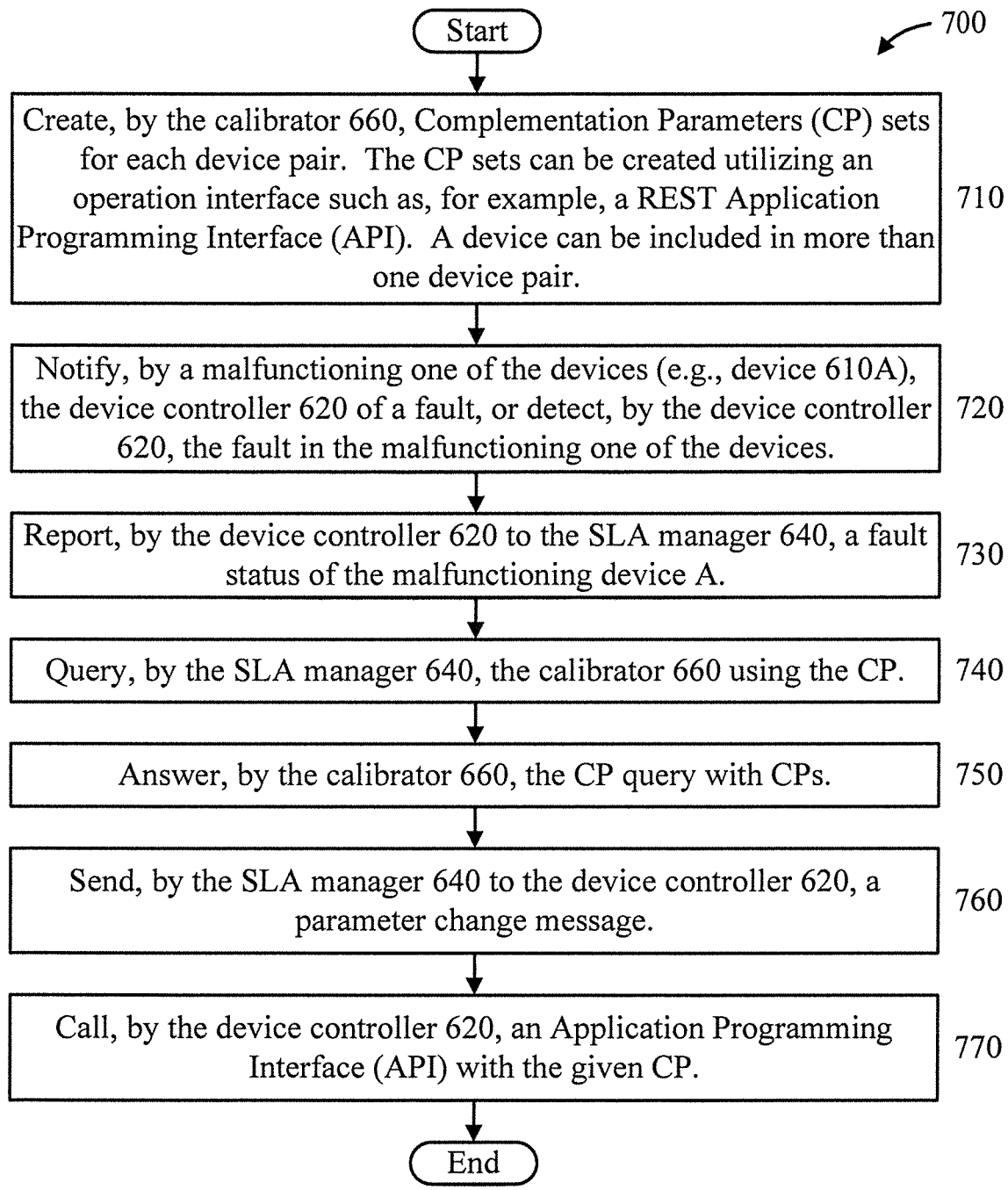
FIG. 7 is a flow diagram showing an exemplary method for ensuring service level, in accordance with an embodiment of the present invention.

FIG. 6 is a block diagram showing an exemplary system 600 for ensuring service level, in accordance with an embodiment of the present invention. FIG. 7 is a flow diagram showing an exemplary method 700 for ensuring service level, in accordance with an embodiment of the present invention.

The system 600 includes multiple user devices 610A, 610B, and 610C, a device controller 620, a device status database (DB) 630, a Service Level Agreement (SLA) manager 640, a SLA DB 650, a calibrator 660, and a parameter DB 670. One or more of the preceding elements can be processor based. One or more of the preceding elements can be implemented as a specially programed software module, a hardware device (e.g., an Application Specific Integrated Circuit), or a combination thereof. While shown as separate elements of system 600, in an embodiment, two or more of elements 620, 640, and 660 can be combined. Moreover, while shown as separate elements of system 600, two or more of elements 630, 650 and 670 can be combined. Additionally, in an embodiment, at least one of elements 620, 640 and 660 is processor-based. These and other variations of the elements shown in FIG. 6 are readily determined by one of ordinary skill in the art given the teachings of the present invention provided herein, while maintaining the spirit of the present invention.

The system 600 can be deployed in an IoT environment. The system 600 can include an IoT network 690 that includes the multiple user devices 610A, 610B, and 610C as IoT devices capable of communicating via the IoT network 690. Hence, in an embodiment, user devices 610A, 610B, and 610C are IoT enabled devices.

At block 710, create, by the calibrator 660, Complementation Parameters (CP) sets for each device pair. The CP sets can be created utilizing an operation interface such as, for example, a REST Application Programming Interface (API). In an embodiment, a device can be included in more than one device pair.

At block 720, notify, by a malfunctioning one of the devices (e.g., device 610A), the device controller 620 of a fault, or detect, by the device controller 620, the fault in the malfunctioning one of the devices.

At block 730, report, by the device controller 620 to the SLA manager 640, a fault status of the malfunctioning device A.

At block 740, query, by the SLA manager 640, the calibrator 660 using the CP.

At block 750, answer, by the calibrator 660, the CP query with CPs.

At block 760, send, by the SLA manager 640 to the device controller 620, a parameter change message.

At block 770, call, by the device controller 620, an Application Programming Interface (API) with the given CP.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
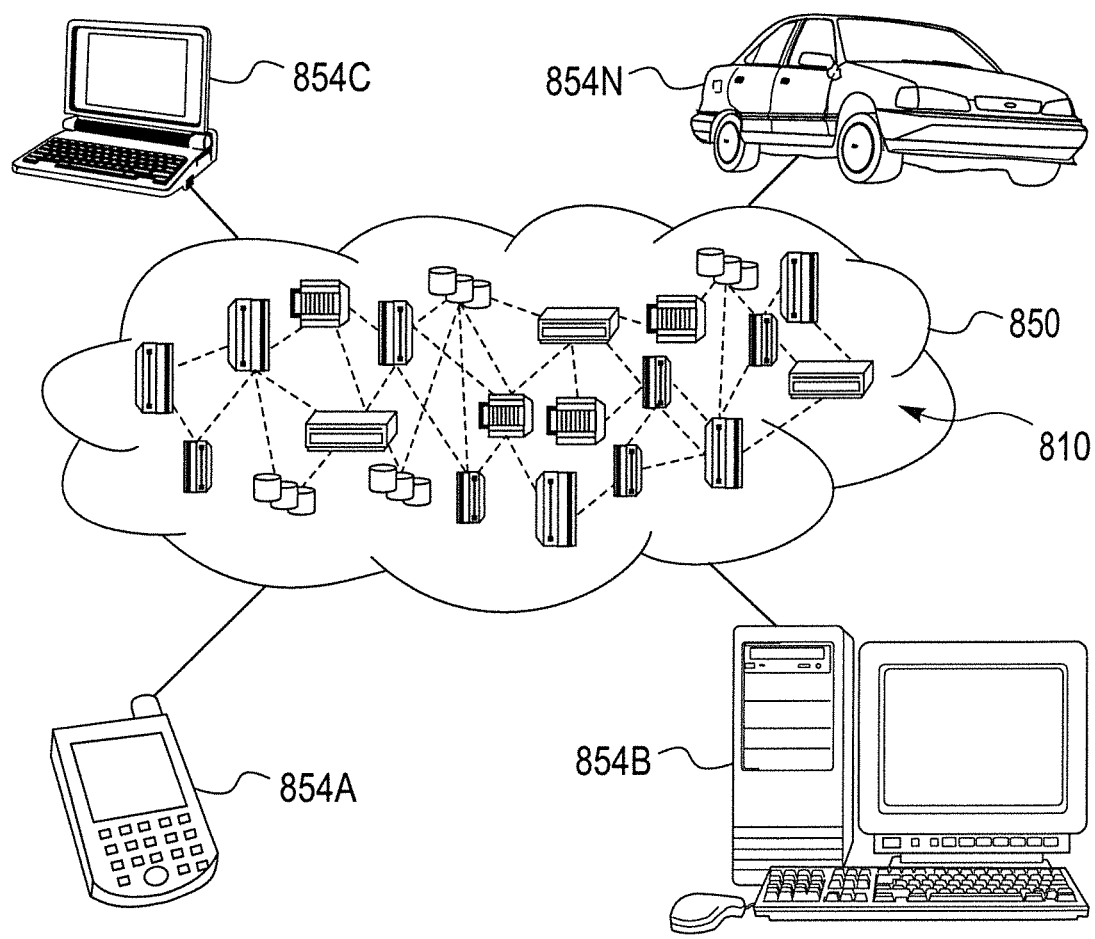
FIG. 8 is a block diagram showing an illustrative cloud computing environment having one or more cloud computing nodes with which local computing devices used by cloud consumers communicate, in accordance with an embodiment of the present invention.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
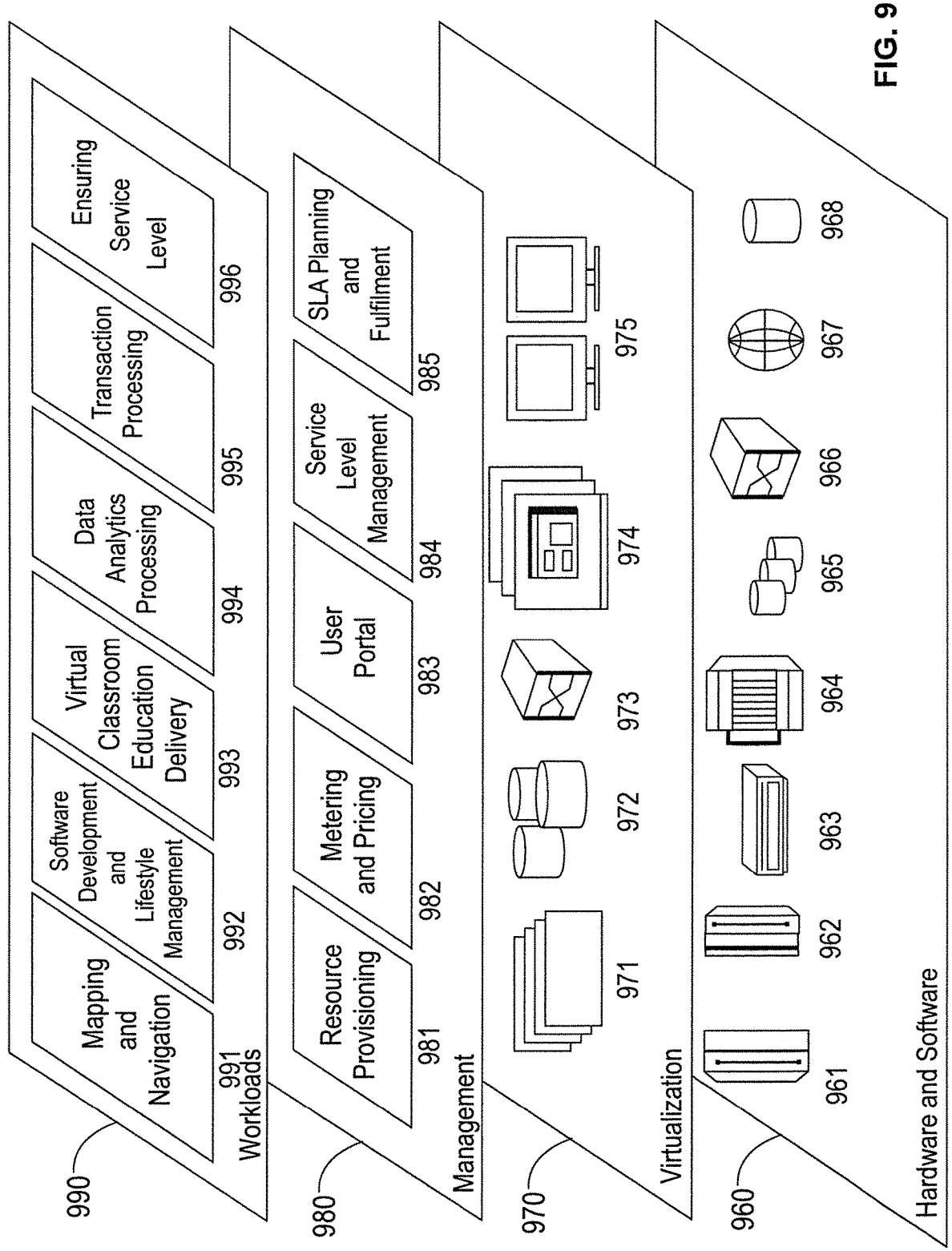
FIG. 9 is a block diagram showing a set of functional abstraction layers provided by a cloud computing environment, in accordance with an embodiment of the present invention.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below.

Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and ensuring service level by mutual complementation of IoT devices 996.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for ensuring a particular service level provided by at least two self-guided robots, comprising:
    maintaining, by a database, complementation parameters for a set of robot groups, each of the robot groups including the at least two self-guided robots such that one of the at least two self-guided robots complements at least one functionality of another one of the at least two self-guided robots in a same one of the robot groups;

monitoring, by a processor operatively coupled to the database, the self-guided robots in the robot groups to detect device malfunctions; and responsive to a detection of a malfunctioning device from among the robot groups, ensuring, by the processor, the particular service level by changing complementation parameters of a corresponding one of the self-guided robots paired with the malfunctioning device, wherein the at least two self-guided robots are configured to provide a guidance service to a user in a facility.

2. The computer-implemented method of claim 1, wherein the method is employed in an Internet of Things environment.

3. The computer-implemented method of claim 1, wherein the at least two self-guided robots in each of the robot groups are comprised in an Internet of Things network.

4. The computer-implemented method of claim 1, wherein the malfunctioning device is configured to self-detect a malfunction.

5. The computer-implemented method of claim 1, wherein the processor is configured to detect a malfunction in any of the at least two self-guided robots in each of the robot groups.

6. The computer-implemented method of claim 1, wherein the complementation parameters of the corresponding one of the self-guided robots paired with the malfunctioning device are changed using a parameter change message.

7. The computer-implemented method of claim 6, wherein the parameter change message is sent from the processor to a device controller operatively coupled to each of the at least two self-guided robots in each of the robot groups.

8. The computer-implemented method of claim 1, wherein the complementation parameters of the corresponding one of the self-guided robots paired with the malfunctioning device are changed using an application programming interface.

9. The computer-implemented method of claim 1, further comprising initially creating the complementation parameters using an operation interface.

10. The computer-implemented method of claim 9, wherein the operation interface comprises a Representational State Transfer.

11. A computer program product for ensuring a particular service level provided by at least two self-guided robots, the computer program product comprising a non-transitory computer readable storage medium having program instructions embodied therewith, the program instructions executable by a computer to cause the computer to perform a method comprising:

maintaining, by a database, complementation parameters for a set of robot groups, each of the robot groups including the at least two self-guided robots such that one of the at least two self-guided robots complements at least one functionality of another one of the at least two self-guided robots in a same one of the robot groups;

monitoring, by a processor operatively coupled to the database, the self-guided robots in the robot groups to detect device malfunctions; and responsive to a detection of a malfunctioning device from among the robot groups, ensuring, by the processor, the particular service level by changing complementation parameters of a corresponding one of the self-guided robots paired with the malfunctioning device, wherein the at least two self-guided robots are configured to provide a guidance service to a user in a facility.

12. The computer program product of claim 11, wherein the method is employed in an Internet of Things environment.

13. The computer program product of claim 11, wherein the at least two self-guided robots in each of the robot groups are comprised in an Internet of Things network.

14. The computer program product of claim 11, wherein the malfunctioning device is configured to self-detect a malfunction.

15. The computer program product of claim 11, wherein the processor is configured to detect a malfunction in any of the at least two self-guided robots in each of the robot groups.

16. The computer program product of claim 11, wherein the complementation parameters of the corresponding one of the self-guided robots paired with the malfunctioning device are changed using a parameter change message.

17. The computer program product of claim 16, wherein the parameter change message is sent from the processor to a device controller operatively coupled to each of the at least two self-guided robots in each of the robot groups.

18. The computer program product of claim 11, wherein the complementation parameters of the corresponding one of the self-guided robots paired with the malfunctioning device are changed using an application programming interface.

19. The computer program product of claim 11, wherein the method further comprises initially creating the complementation parameters using an operation interface.

20. A computer processing system for ensuring a particular service level provided by multiple at least two self-guided robots, comprising:

a database for maintaining complementation parameters for a set of robot groups, each of the robot groups including the at least two self-guided robots such that one of the at least two self-guided robots can complements at least one functionality of another one of the at least two self-guided robots in a same one of the robot groups; and a processor, operatively coupled to the database, configured to:

monitor the self-guided robots in the robot groups to detect device malfunctions; and responsive to a detection of a malfunctioning device from among the robot groups, ensure the particular service level by changing complementation parameters of a corresponding one of the self-guided robots paired with the malfunctioning device, wherein the at least two self-guided robots are configured to provide a guidance service to a user in a facility.

* * * * *